Figure 1:
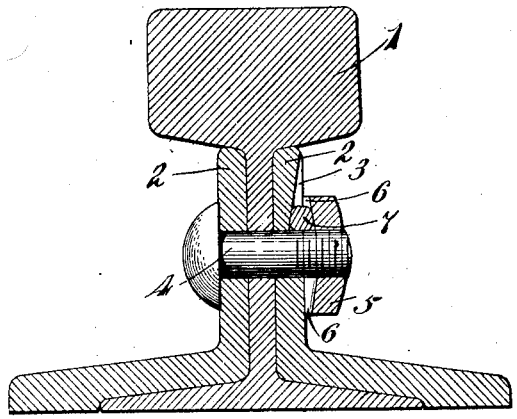

No. 832,865. PATENTED OCT. 9, 1906.

P. LORD.

NUT LOCK.

APPLICATION FILED MAR. 15, 1906.

Witnesses:
Eugene M. Sliney
C. C. Cousins

Peter Lord.
Inventor,
By Marion & Marion
Attorneys

UNITED STATES PATENT OFFICE.

PETER LORD, OF MONTREAL, QUEBEC, CANADA, ASSIGNOR OF ONE-HALF TO GEORGE PAYETTE & COMPANY, OF MONTREAL, CANADA, A FIRM.

NUT-LOCK.

No. 832,865.     Specification of Letters Patent.     Patented Oct. 9, 1906.

Application filed March 15, 1906. Serial No. 306,140.

*To all whom it may concern:*

Be it known that I, PETER LORD, a subject of the King of Great Britain, residing in the city and district of Montreal, in the Province of Quebec, Canada, have invented certain new and useful Improvements in Nut-Locks; and I do hereby declare that the following is a full, clear, and exact description of the invention, such as will enable others skilled in the art to which it appertains to make and use the same.

My invention relates to nut-locks.

The object of my invention is to provide a simple, safe, and efficient device of this character; and my invention consists of the construction, combination, and arrangement of parts, as herein illustrated, described, and claimed.

In the accompanying drawings, forming part of this application, I have illustrated a form of embodiment of my invention, in which drawings similar reference characters designate corresponding parts, and in which—

Figure 2:
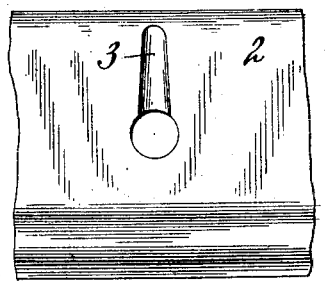
Figure 3:
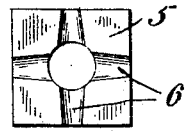
Figure 4:

Figure 1 is a transverse vertical section through a rail and rail-chair, showing the application of my invention. Fig. 2 is an enlarged side elevation of a section of a rail-chair adapted for use in connection with my invention. Fig. 3 is an inside face elevation of the nut adapted for use in connection with my invention. Fig. 4 is a plan view of an insertible member adapted for use in connection with my invention.

Referring to the drawings, 1 designates a rail, and 2 the rail-chairs, of ordinary construction. One of the rail-chairs 2 is provided in its outer face with a tapered slot 3. Disposed through the rail-chairs and the web of the rail 1 is a bolt 4, adapted to receive a nut 5 of ordinary construction. The inner face of the nut is provided with tapered semicylindrical slots 6, radiating from its bore. Adapted to be inserted in the slots 6 is a solid round member 7, composed of compressible material, such as Babbitt metal, which when it is inserted in said slots and bears on the bolt 4 may be flattened by the insertion of a suitable instrument, so that the nut 5 is locked against movement and is adapted to withstand any ordinary strain. When it is desired to remove the nut 5, extraordinary pressure may be brought to bear thereon by means of suitable mechanism, whereby the soft-metal member 7 may be sheared off by turning the nut.

While I have shown the invention applied to clamping a rail-chair in position, it will be understood that the member 2 may be any member which it is desired to hold in position by means of a nut on a screw-threaded member.

Having thus fully described my invention, what I claim as new, and desire to secure by Letters Patent, is—

1. In a nut-lock, the combination comprising a member to be held in position and provided with a tapered semicylindrical slot, a screw-threaded member disposed through the member to be held in position, a nut disposed on the screw-threaded member and provided with tapered semicylindrical slots adapted to register with the slot in the member to be held in position, and a compressible insertible member disposed in said registering slots.

2. In a nut-lock, the combination comprising a member to be held in position and provided with a tapered slot, a screw-threaded member disposed through the member to be held in position, a nut disposed on the screw-threaded member and provided with tapered semicylindrical slots adapted to register with the slot in the member to be held, said slots being of greater dimensions adjacent the bore of the nut, and a compressible insertible member disposed in said registering slots and compressed to fill the slots at the point of their greatest dimensions.

In witness whereof I have hereunto set my hand in the presence of two witnesses.

PETER LORD.

Witnesses:
    T. MYNARD,
    JOS. J. B. CHARBONNEAU.